STOCKSTILL & HUMES.
Seed Dropper.

No 12,260.  Patented Jan. 16, 1855.

UNITED STATES PATENT OFFICE.

STEPHEN L. STOCKSTILL AND PETER H. HUMES, OF BRANDT, OHIO.

IMPROVEMENT IN SEED-PLANTERS.

Specification forming part of Letters Patent No. 12,260, dated January 16, 1855.

*To all whom it may concern:*

Be it known that we, STEPHEN L. STOCKSTILL and PETER H. HUMES, both of Brandt, Miami county, Ohio, have invented new and useful Improvements in Seed-Planters; and we do hereby declare the following to be a full, clear, and exact description thereof, reference being had to the annexed drawings, making part of this specification.

It is our aim in this invention to insure an even and regular feed; to allow capacity for grains of varying size; to keep the feed from lodging or packing in the hopper; to divide a given portion of grain equally in two drills without duplication of parts; to so hang the feed-wheel as that a trifling inequality of draft shall not prevent the correct action of the wheel.

Figure 1:
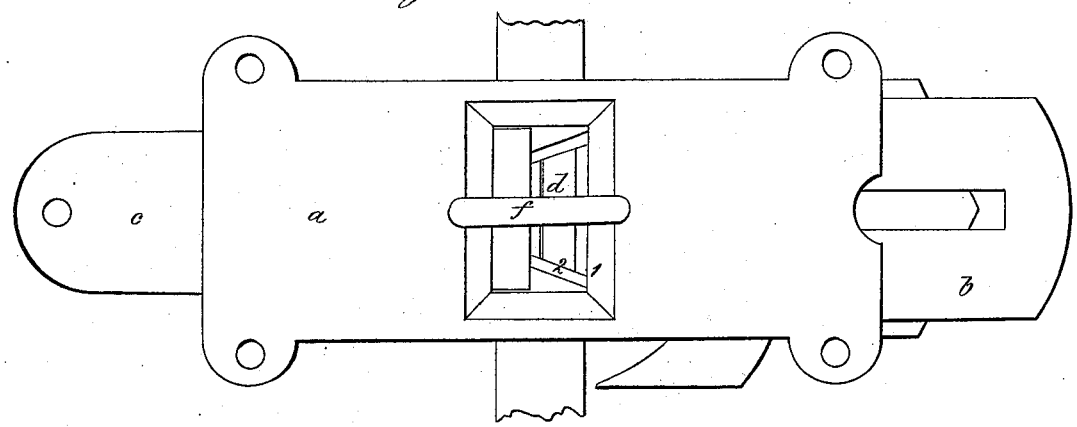
Figure 2:
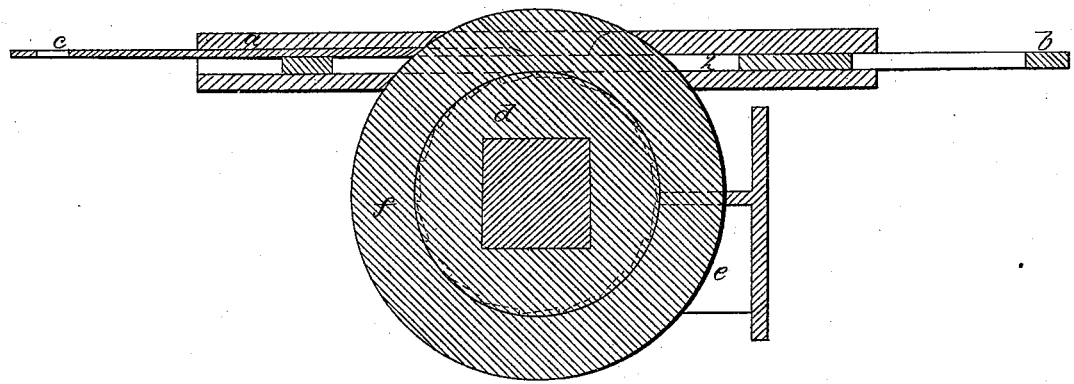
Figure 3:
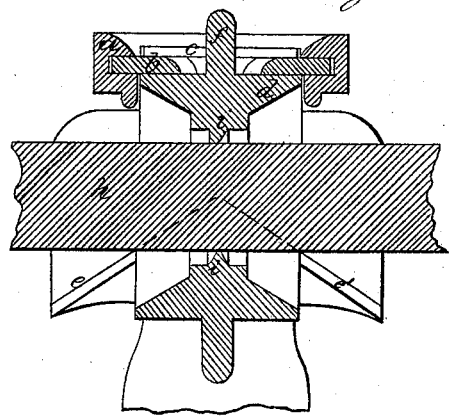

In the accompanying drawings, Figure 1 is a top view of the feeding apparatus. Fig. 2 is a longitudinal section thereof. Fig. 3 is a transverse section.

The feeding apparatus, as shown in the drawings, is located below the hopper which contains the seed-grain, and consists of a plate, $a$, with a beveled-edged opening, 1, through it and forming a mouth-piece.

The regulation of the rate of feed being a matter requiring great care and accuracy, (one-sixteenth of an inch making a difference of several quarts per acre,) it is desirable it should be an entirely distinct operation and independent of the cut-off movement, which, having to be frequently employed, would engross too much time if depended upon for regulating the feed. We therefore use two plates, $b$ and $c$, for these several processes. Immediately beneath this is a plate, $c$, resembling in form a plane-bit, with the slot continued to the edge, and this, by its retraction or impulsion forward, can be made alternately to open or close the aperture in the plate $a$. Below this plate $c$ is another sliding plate, $b$, with an aperture, 2, through it of a triangular shape, so as by its motion in or out to limit the size of the passage through which the seed passes. Beneath these plates the feed-wheel $d$ revolves. The perimeter of this wheel is armed with ratchet-shaped teeth to carry forward the seed which has passed through the feed-opening and discharge it onto the spouts $e\ e'$, which are prolonged, as required, to deliver the seed at a suitable point. The edges of the triangular aperture through the plate $b$ converge lengthwise of the plate, so that as it is slid back the passage-way becomes narrowed and diminished in area.

From the middle of the perimeter of the toothed cylinder or feed-wheel projects a flange, $f$, whose diameter is so far extended as to project through the plates, which have been described, and extend a slight distance above them into the hopper. This answers several useful purposes. It divides the seed off into two equal portions and conducts one portion off to each side. It prevents the seed becoming choked at the bottom of the hopper, and it prevents choking of the feed-openings.

The opening and closing of the aperture by the projection or retraction of the plate $b$ affords a means of regulating the area of the feed-passage and supersedes the necessity of extra wheels to regulate the feed.

The wheel $d$ is hung upon the square shaft $h$ by the V-edge $i$, so as that irregularity of motion or jarring of the running-gear shall not be communicated to or disturb the feed.

We claim as new and of our invention—

1. The converging openings of the gage-board, enabling the graduation of the amount of feed without narrowing or circumscribing the passage with respect to the size of grain, which is thus preserved from cutting or injury.

2. The dividing ridge or flange around the perimeter of the feed-wheel at its mid-width, enabling the same wheel to "score" two exactly equal rows, and at the same time serving to stir the grain and to shift out of the way any tailings or other obstructions that would intercept the discharge.

3. The beveled or flaring axial mortise through the feed-wheel, preventing any unevenness of the axle from wabbling or clogging the wheel or disturbing the feed.

In testimony whereof we hereunto set our hands before two subscribing witnesses.

S. L. STOCKSTILL.
PETER H. HUMES.

Witnesses:
GEO. W. HOUK,
F. P. CUPPY.